(12) United States Patent
Matsumoto (10) Patent No.: US 11,110,617 B2
(45) Date of Patent: Sep. 7, 2021

(54) LINEAR MOTION MECHANISM

(71) Applicant: FANUC CORPORATION, Yamanashi (JP)

(72) Inventor: Kuniyasu Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/062,349

(22) Filed: Oct. 2, 2020

(65) Prior Publication Data

US 2021/0129359 A1 May 6, 2021

(30) Foreign Application Priority Data

Oct. 30, 2019 (JP) .............................. JP2019-197858

(51) Int. Cl.
| | | |
|---|---|---|
| B25J 18/02 | (2006.01) | |
| B25J 9/12 | (2006.01) | |
| F16H 25/22 | (2006.01) | |
| F16H 25/20 | (2006.01) | |

(52) U.S. Cl.
CPC .............. *B25J 18/025* (2013.01); *B25J 9/123* (2013.01); *F16H 25/2204* (2013.01); *F16H 2025/204* (2013.01)

(58) Field of Classification Search
CPC ............ F16H 25/2204; F16H 2025/204; B25J 18/025; B25J 9/123
See application file for complete search history.

(56) References Cited

U.S. PATENT DOCUMENTS

| | | | | |
|---|---|---|---|---|
| 3,819,061 A | * | 6/1974 | Andersson | B23Q 7/04 414/591 |
| 5,279,084 A | * | 1/1994 | Atsukawa | B66F 3/08 52/111 |
| 5,733,096 A | * | 3/1998 | Van Doren | B25J 18/025 212/296 |
| 9,953,677 B1 | * | 4/2018 | Zhu | B25J 18/025 |
| 2004/0000818 A1 | * | 1/2004 | Preuthun | A61M 5/14566 310/83 |
| 2006/0235571 A1 | * | 10/2006 | Baba | A61L 27/18 700/254 |
| 2011/0240817 A1 | * | 10/2011 | Lee | B25J 5/04 248/333 |
| 2018/0087634 A1 | * | 3/2018 | Muster | F16H 25/2204 |
| 2018/0119783 A1 | * | 5/2018 | Horn | F16H 25/2056 |
| 2019/0360567 A1 | * | 11/2019 | Hu | B66F 3/10 |
| 2019/0390752 A1 | * | 12/2019 | Tsai | F16B 7/10 |

FOREIGN PATENT DOCUMENTS

JP      2001205582 A * 7/2001 ......... F16H 25/2056

* cited by examiner

*Primary Examiner* — David M Fenstermacher
(74) *Attorney, Agent, or Firm* — Nakanishi IP Associates, LLC (57) ABSTRACT

A linear motion mechanism includes: a plurality of linear motion elements that are cascaded in a mutually movable manner; a shaft fixed to one of adjacent linear motion elements among the plurality of linear motion elements; and a slider movably engaged with the shaft and fixed to the other of adjacent linear motion elements.

7 Claims, 9 Drawing Sheets

LINEAR MOTION MECHANISM

CROSS-REFERENCE TO RELATED APPLICATIONS

This application is based upon and claims the benefit of priority from the Japanese Patent Application No. 2019-197858, filed Oct. 30, 2019 the entire contents of which are incorporated herein by reference.

FIELD

Embodiments described herein relate generally to a linear motion mechanism.

BACKGROUND

An arm that has a telescopic structure, which can be smoothly extended and retracted, may in some cases be adopted in a robot apparatus. Such a telescopic structure arm is made up of a plurality of cylindrical members, each of which has a different diameter, and the cylindrical members are assembled in a nested structure. Requirements on such a telescopic structure arm include being small and lightweight, having high rigidity, and being of dust and dripproof.

A telescopic structure arm, in which cylindrical members move relative to each other, requires a clearance in a sliding portion to keep low sliding resistance while the arm is extending or retracting. The clearance is indispensable to secure slidability, while it reduces rigidity of the entire arm. The telescopic structure arm typically has a structure that includes a multi-stage linear motion rail and a cover over the outer circumference of the rail. To increase rigidity with the structure, it is necessary to thicken the linear motion rail, and the problem is that the outside diameter of the outer-circumferential cover increases accordingly, and thus the entire arm increases in size and weight.

SUMMARY OF INVENTION

Technical Problem

For a linear motion mechanism applicable to a robot arm and the like, there is a need to realize improvement in the rigidity without increasing the size of the mechanism.

Solution to Problem

A linear motion mechanism according to an aspect of the disclosure includes: a plurality of linear motion elements that are cascaded in a mutually movable manner; a shaft fixed to one of adjacent linear motion elements among the plurality of linear motion elements; and a slider movably engaged with the shaft and fixed to the other of the adjacent linear motion elements.

According to the aspect, in a linear motion mechanism applicable to a robot arm and the like, improvement in the rigidity can be realized without increasing the size of the mechanism.

DETAILED DESCRIPTION

A linear motion mechanism according to an embodiment will now be described with reference to drawings. In the description below, components that have substantially like functions and configurations will have like reference characters and the description will be repeated only as necessary. The linear motion mechanism according to the embodiment may be used alone, or may be used for an arm unit (movable section) of a linear motion extendable joint of a robot arm mechanism.

Figure 1:
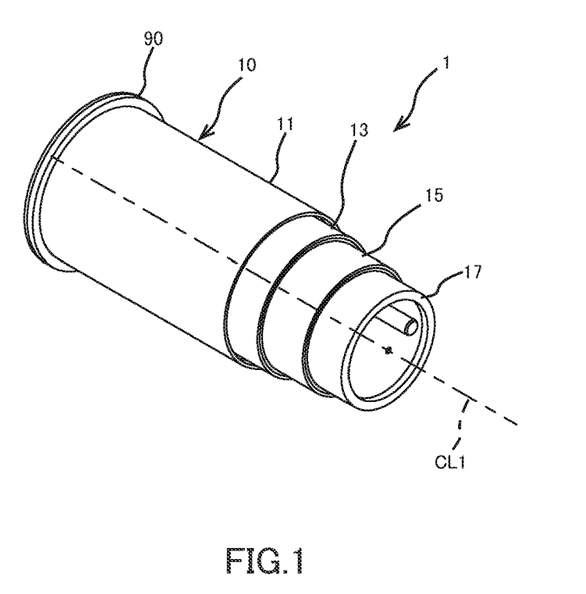
FIG. 1 is a perspective view of a retracted linear motion mechanism according to an embodiment.
Figure 2:
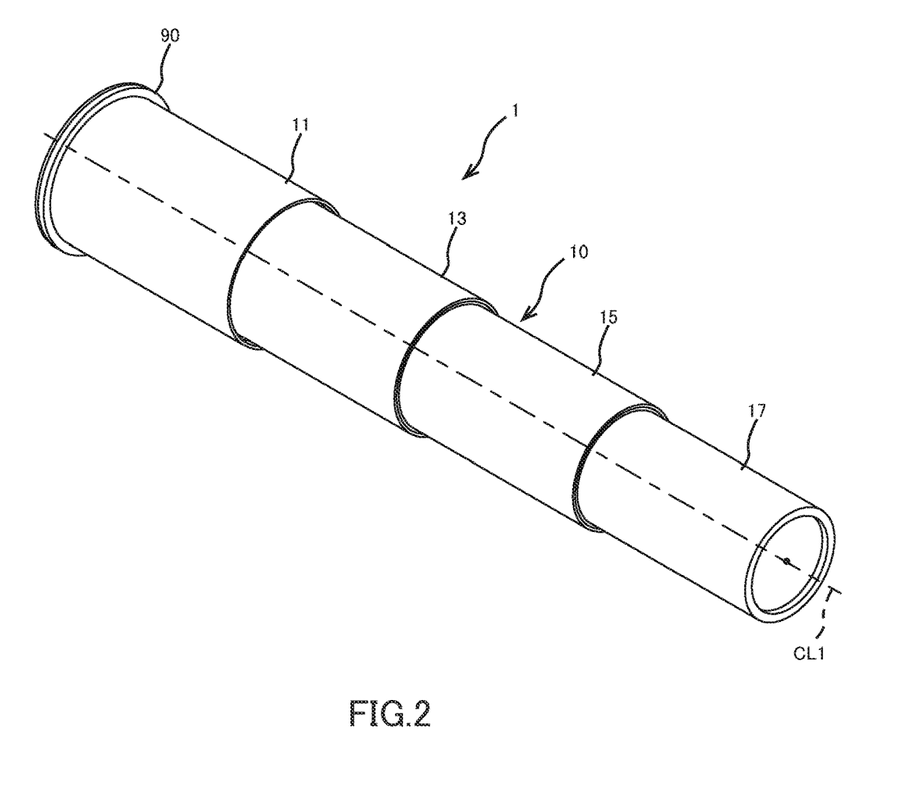
FIG. 2 is a perspective view of an extended linear motion mechanism.
Figure 3:
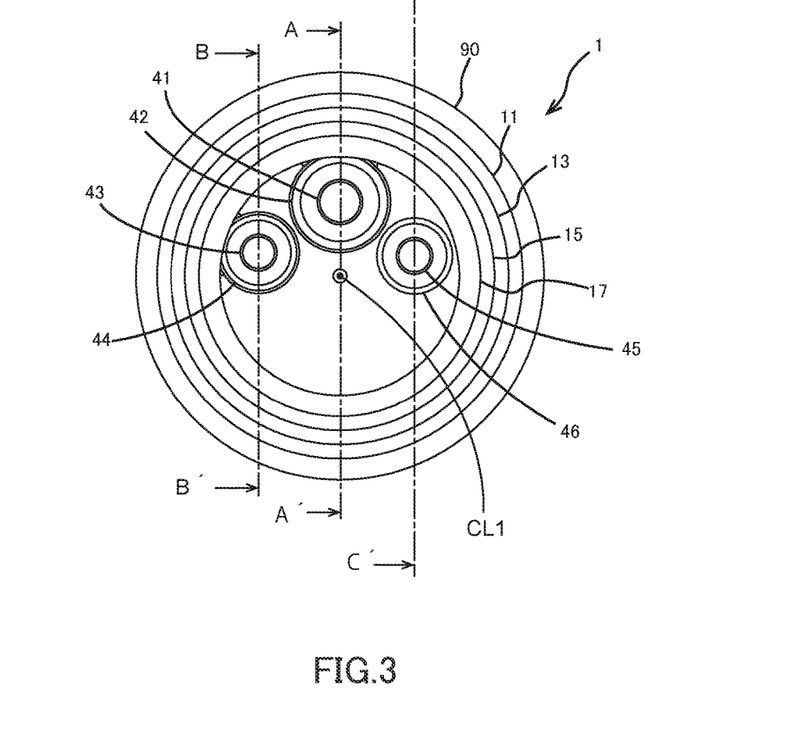
FIG. 3 is a front view of the linear motion mechanism of FIG. 2.

As illustrated in FIG. 1 and FIG. 2, a linear motion mechanism 1 includes a plate-like base portion 90 and an extendable arm unit 10 supported by the base portion 90. The arm unit 10 includes a plurality of linear motion elements that are cascaded in a mutually movable manner. In the embodiment, cylindrical bodies will be described as an example of the linear motion element. The arm unit 10 is composed of a plurality, four herein, of cylindrical bodies 11, 13, 15, 17 ruggedly assembled in a telescopic structure (multi-stage nested structure). Note that cylindrical bodies constituting the arm unit 10 may have a rectangular cylindrical shape.

As illustrated in FIGS. 4 to 9, a tail-end cylindrical body 11 is fixed to the base portion 90 with a trailing end flange of the cylindrical body 11. A cylindrical body 13 is movably connected to the tail-end cylindrical body 11 through a sliding bearing 21 provided on an inner-circumference surface of a leading end of the cylindrical body 11. A cylindrical body 15 is movably connected to the cylindrical body 13 through a sliding bearing 23 provided on an inner-circumference surface of a leading end of the cylindrical body 13. A forefront-end cylindrical body 17 is connected to the cylindrical body 15 through a sliding bearing 25 provided on an inner-circumference surface of a leading end of the cylindrical body 15. Such a structure in which adjacent two cylindrical bodies are connected through the sliding bearing is adopted to prevent thickening of the entire arm unit 10 and produce an effect of improving the water and dust-proof ability of the arm unit 10.

The arm unit 10 that has a telescopic structure as described above can extend and retract back and forth along a cylinder center line CL1. Since the telescopic structure is adopted, the arm unit 10 is rigid by itself to a certain extent. However, the arm unit 10 is required to be improved further in its rigidity in such a case where a greater extension length is required or where the arm unit 10 is adopted in a robot arm mechanism for picking heavy objects, for example. In the embodiment, a reinforcement structure is provided for improving the rigidity of the arm unit 10 that has a telescopic structure. Typically, the reinforcement structure is constituted of a ball spline mechanism. The ball spline mechanism is located between adjacent two cylindrical bodies. Note that although the ball spline mechanism is adopted as the reinforcement structure in the embodiment in view of securing the rigidity, other linear motion mechanisms may be adopted such as a linear motion mechanism that includes a rail and a slider that engages with the rail.

Figure 4:
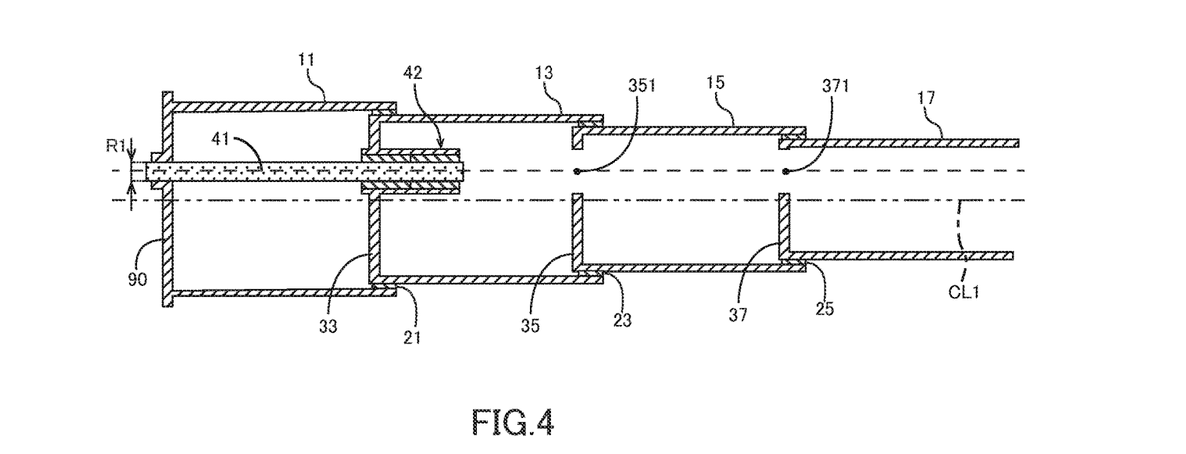
FIG. 4 is an A-A' end view of FIG. 3.

Specifically, as illustrated in FIG. 4, a first spline shaft 41 that constitutes a first ball spline mechanism is oriented in parallel to the cylinder center line CL1 and has a trailing end thereof fixed to the base portion 90, and a first spline nut 42 into which the first spline shaft 41 is inserted is fixed to a first coupling plate 33 coupled to a trailing edge of the cylindrical body 13. In this way, following the movement of the cylindrical body 13 with respect to the cylindrical body 11, the first spline nut 42 can move with respect to the first spline shaft 41.

Figure 6:
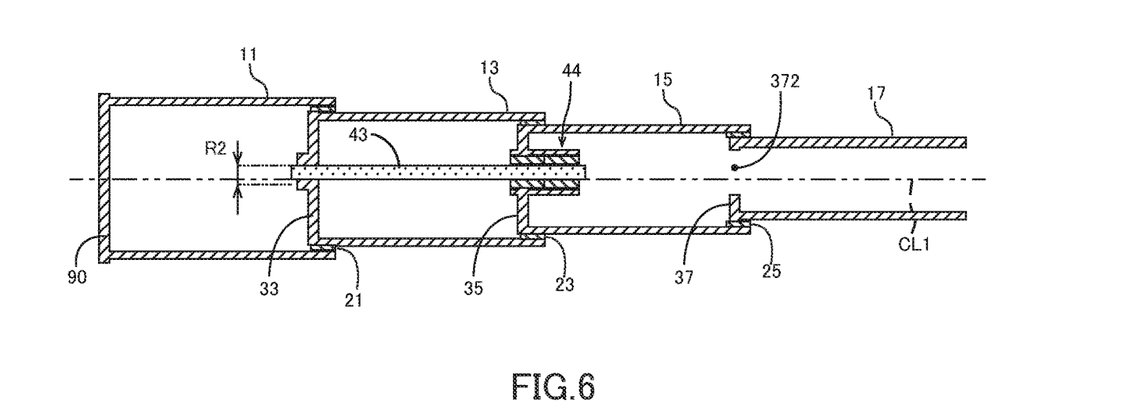
FIG. 6 is a B-B' end view of FIG. 3.

As illustrated in FIG. 6, a second spline shaft 43 that constitutes a second ball spline mechanism is oriented in parallel to the cylinder center line CL1 and has a trailing end thereof fixed to the first coupling plate 33, and a second spline nut 44 into which the second spline shaft 43 is inserted is fixed to a second coupling plate 35 coupled to a trailing edge of cylindrical body 15. In this way, following the movement of the cylindrical body 15 with respect to the cylindrical body 13, the second spline nut 44 can move with respect to the second spline shaft 43.

Figure 8:
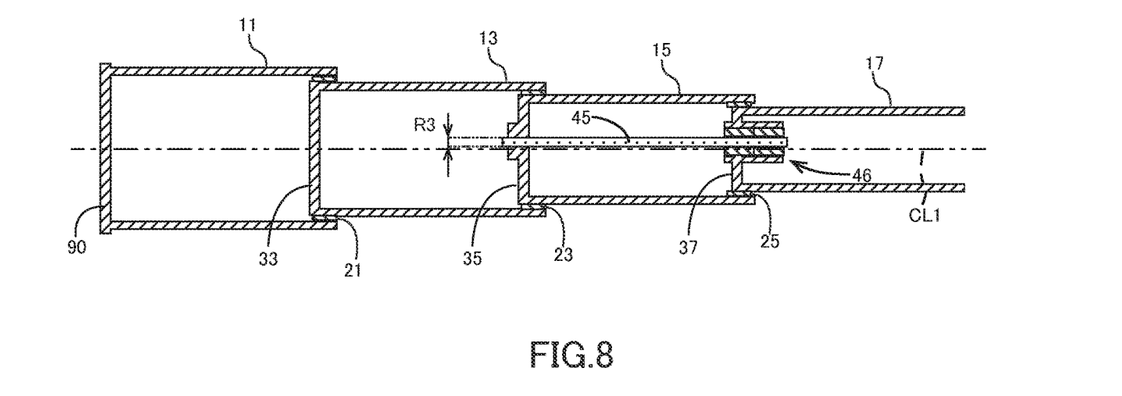
FIG. 8 is a C-C' end view of FIG. 3.

As illustrated in FIG. 8, a third spline shaft 45 that constitutes a third ball spline mechanism is oriented in parallel to the cylinder center line CL1 and has a trailing end thereof fixed to the second coupling plate 35, and a third spline nut 46 into which the third spline shaft 45 is inserted is fixed to a third coupling plate 37 coupled to a trailing edge of the cylindrical body 17. In this way, following the movement of the cylindrical body 17 with respect to the cylindrical body 15, the third spline nut 46 can move with respect to the third spline shaft 45.

Figure 5:
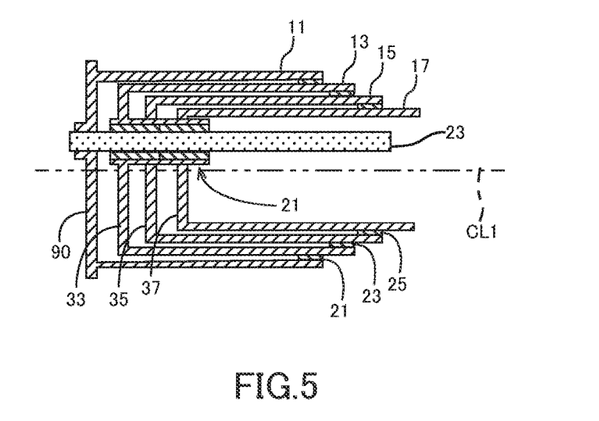
FIG. 5 illustrates a retracted state of the linear motion mechanism of FIG. 4.
Figure 7:
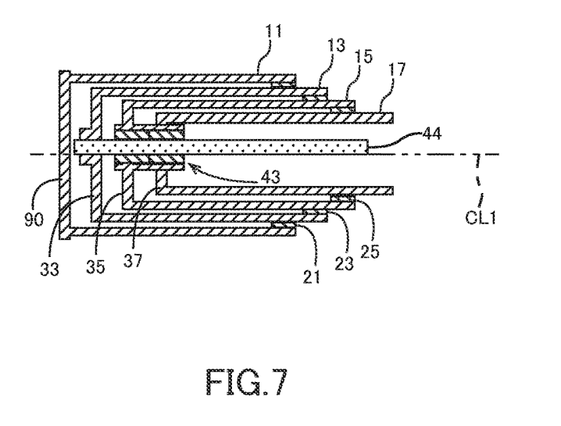
FIG. 7 illustrates a retracted state of the linear motion mechanism of FIG. 6.
Figure 9:
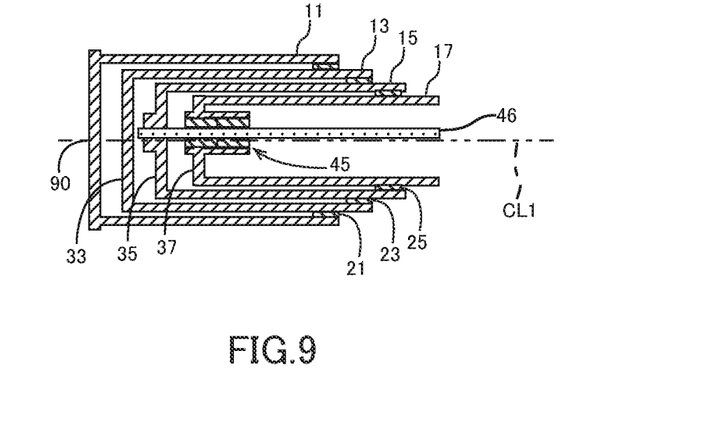
FIG. 9 illustrates a retracted state of the linear motion mechanism of FIG. 8.

The second coupling plate 35 and the third coupling plate 37 are provided with open holes 351 and 371, respectively, to prevent the first ball spline mechanism from colliding with the second coupling plate 35 and the third coupling plate 37 as illustrated in FIG. 4 when the arm unit 10 is retracted as illustrated in FIGS. 5, 7, and 9. The open holes 351 and 371 are each formed around the center line of the first spline shaft 41 in a size necessary for the first ball spline mechanism to pass through the hole. The third coupling plate 37 is provided with a different open hole 372 as illustrated in FIG. 6 to prevent the second ball spline mechanism from colliding with the third coupling plate 37 when the arm unit 10 is retracted. The different open hole 372 is formed around the center line of the second spline shaft 43 in a size necessary for the second ball spline mechanism to pass through the hole.

As illustrated in FIG. 5, the first, second, and third spline shafts 41, 43, and 45 are preferably arranged collectively in an off-axis manner from the cylinder center line CL1. In a space thus made available, a drive mechanism that provides extending and retracting actions of the arm unit 10 can be contained, which enables to suppress an increase in the size of the arm unit 10. As a drive mechanism for the arm unit 10, any mechanism is adopted such as a delivery/withdrawal mechanism of a block train, a rack and pinion mechanism, a ball screw mechanism.

As illustrated in FIGS. 4, 6, and 8, a diameter R1 of the first spline shaft 41 fixed to a base portion 90 on a root side of the arm unit 10 is preferably larger than diameters R2 and R3 of the second and third spline shafts 43 and 45. Thickening the first spline shaft 41 on the base side where the arm unit 10 is subjected to the largest load contributes to improvement in the rigidity of the root portion of the arm unit 10. Similarly, a diameter R3 of the third spline shaft 45 on a leading end side of the arm unit 10 is preferably smaller than diameters R1 and R2 of the first and second spline shafts 41 and 43. Thinning the third spline shaft 45 on the leading end side where the arm unit 10 is subjected to the least load contributes to a reduction in weight of the linear motion mechanism.

According to the above-described linear motion mechanism 1, a load applied on the arm unit 10 can be distributed to 2 types of mechanisms: a plurality of cylindrical bodies 11, 13, 15, and 17, which constitute the telescopic structure; and a plurality of ball spline mechanisms, and the plurality of ball spline mechanisms can be contained within the arm unit 10. Accordingly, it is possible to realize improvement in the rigidity without increasing the size of the arm unit 10 that has a telescopic structure. As a matter of course, since the ball spline mechanism added to reinforce the arm unit 10 is a linear motion mechanism similar to the telescopic structure, the ball spline mechanism will not obstruct the linear motion of the arm unit 10.

The structure of the arm unit of the linear motion mechanism may not be limited to the telescopic structure. For example, the linear motion element that constitutes the arm unit may not necessarily be a cylindrical body and may include a linear guide and a moving body that moves along the linear guide. In a variation, a pole in a solid-cylindrical shape serving as a linear guide and a plate-like moving plate serving as the moving body will be described as an example.

Figure 10:
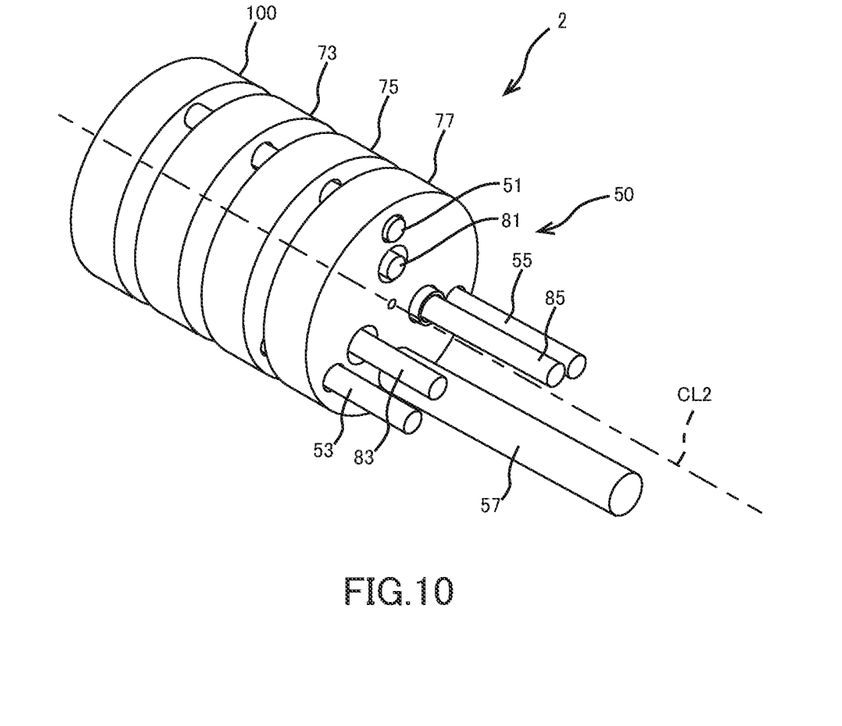
FIG. 10 is a perspective view illustrating a variation of the arm structure in FIG. 1.
Figure 11:
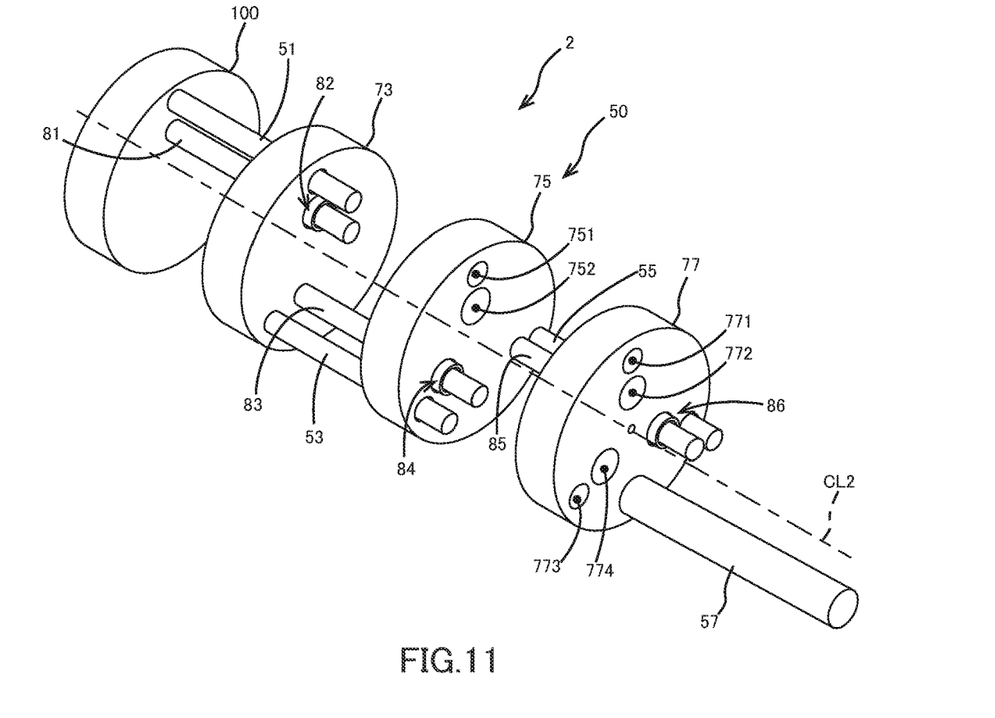
FIG. 11 is a perspective view illustrating an extended state of the linear motion mechanism of FIG. 10.

As illustrated in FIGS. 10 and 11, a linear motion mechanism 2 according to a variation includes a plate-like base portion 100 and an extendable arm unit 50 supported by the base portion 100. The arm unit 50 includes a plurality, four herein, of poles 51, 53, 55, and 57, and a plurality of moving plates 73, 75, and 77 that connect adjacent two poles.

As illustrated in FIGS. 13 to 18, the tail-end pole 51 among the plurality of poles 51, 53, 55, and 57 is oriented in parallel to a specific axis (movement axis) CL2 and has a trailing end thereof fixed to the base portion 100. A first moving plate 73 is movably connected to the tail-end pole 51 through a sliding bearing 63. A trailing end of the pole 53 is oriented in parallel to the movement axis CL2 and fixed to the first moving plate 73. A second moving plate 75 is movably connected to the pole 53 through a sliding bearing 65. A trailing end of the pole 55 is oriented in parallel to the movement axis CL2 and fixed to the second moving plate 75. A third moving plate 77 is movably connected to the pole 55 through a sliding bearing 67. A trailing end of the forefront-end pole 57 is oriented in parallel to the movement axis CL2 and fixed to the third moving plate 77.

The arm unit 50 configured as described above can extend and retract back and forth along the movement axis CL2. Since the sliding bearings are located between the poles and the moving plates, the arm unit 50 is rigid by itself to a certain extent. The linear motion mechanism 2 is provided with a plurality of ball spline mechanisms as a reinforcement structure for improving the rigidity of the arm unit 50. The ball spline mechanism is located between adjacent two moving plates.

Figure 13:
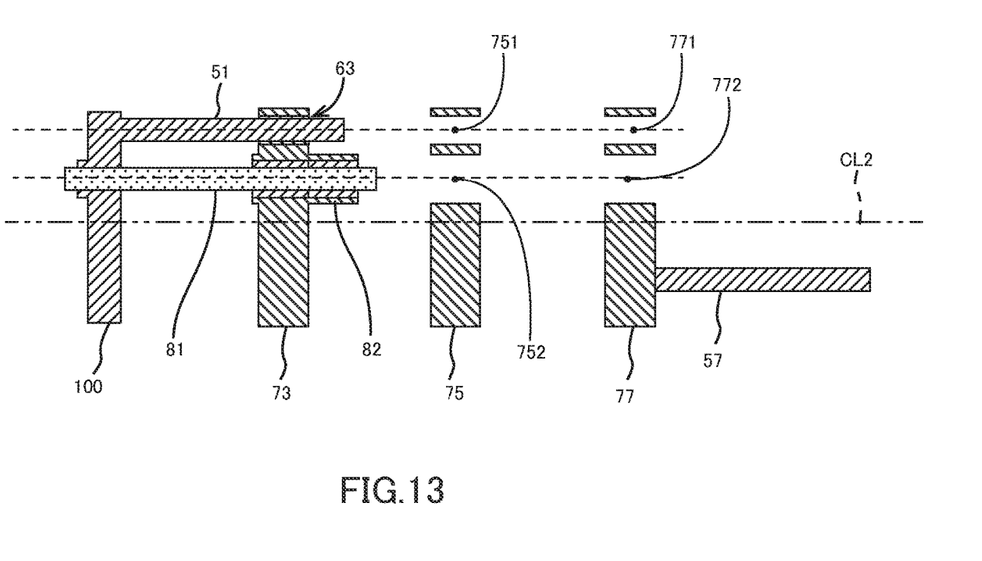
FIG. 13 is a D-D' end view of FIG. 12.
Figure 15:
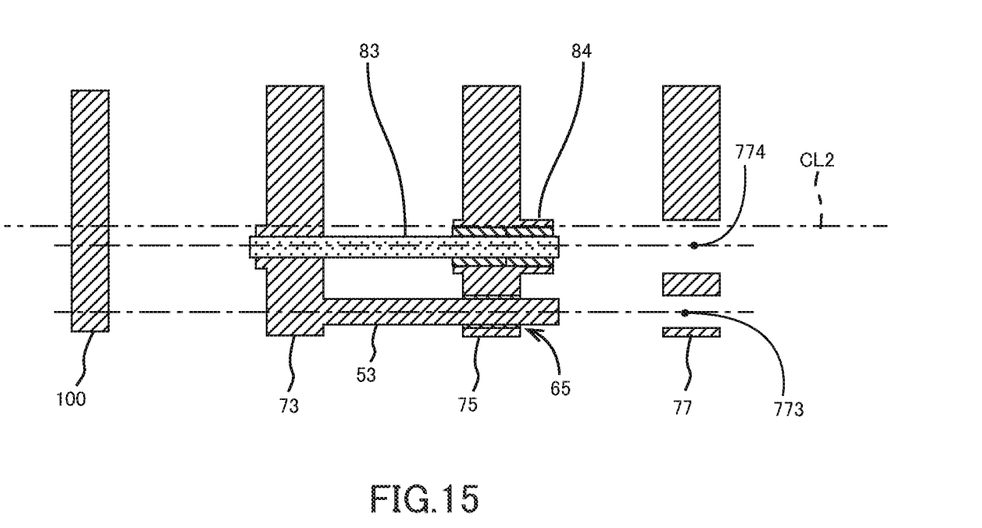
FIG. 15 is an E-E' end view of FIG. 12.
Figure 17:
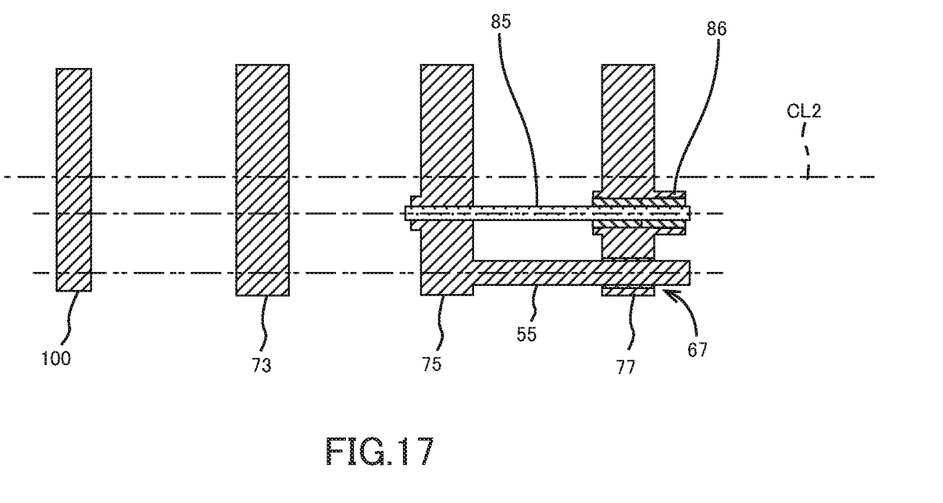
FIG. 17 is an F-F' end view of FIG. 12.

As illustrated in FIG. 13, a first spline shaft 81 that constitutes a first ball spline mechanism is oriented in parallel to the movement axis CL2 and has a trailing end thereof fixed to the base portion 100, and a first spline nut 82 into which the first spline shaft 81 is inserted is fixed to the first moving plate 73. As illustrated in FIG. 15, a second spline shaft 83 that constitutes a second ball spline mechanism is oriented in parallel to the movement axis CL2 and has a trailing end thereof fixed to the first moving plate 73, and a second spline nut 84 into which the second spline shaft 83 is inserted is fixed to the second moving plate 75. As illustrated in FIG. 17, a third spline shaft 85 that constitutes a third ball spline mechanism is oriented in parallel to the movement axis CL2 and has a trailing end thereof fixed to the second moving plate 75, and a third spline nut 86 into which the third spline shaft 85 is inserted is fixed to the third moving plate 77.

Figure 14:
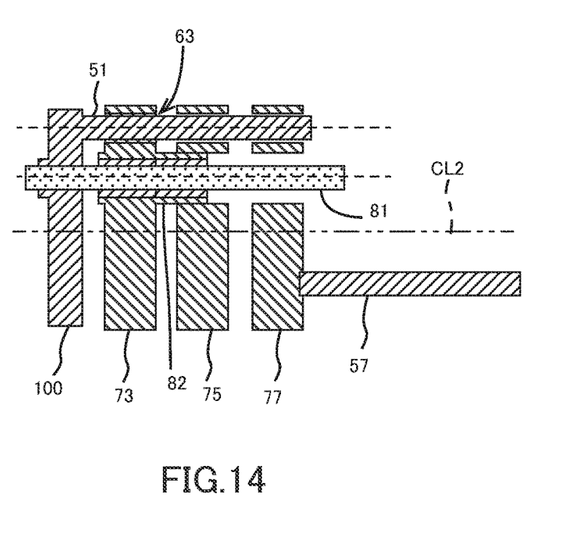
FIG. 14 illustrates a retracted state of the linear motion mechanism of FIG. 13.
Figure 16:
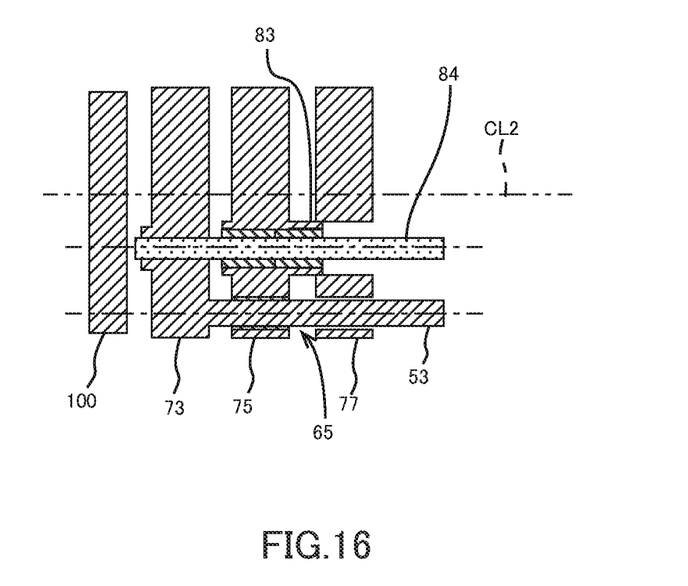
FIG. 16 illustrates a retracted state of the linear motion mechanism of FIG. 15.
Figure 18:
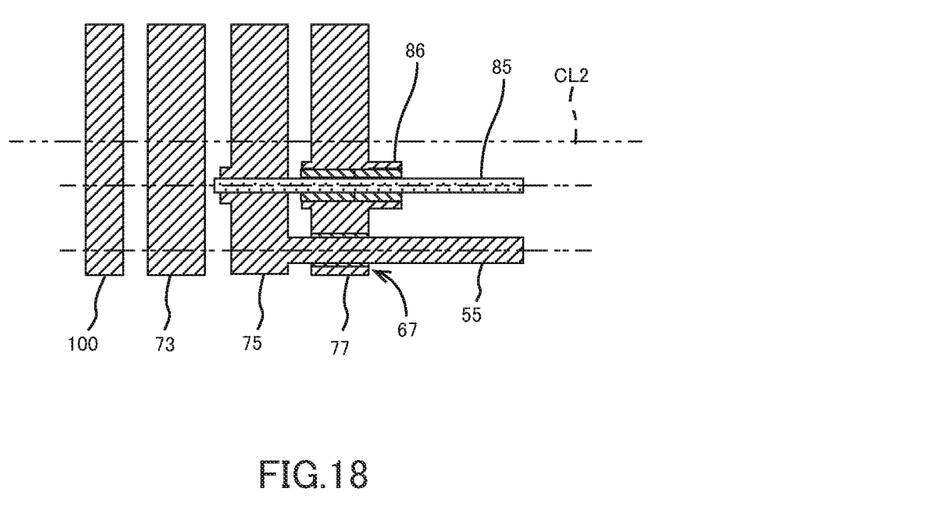
FIG. 18 illustrates a retracted state of the linear motion mechanism of FIG. 17.

The second moving plate 75 is provided with open holes 751 and 752 and the third moving plate 77 is provided with open holes 771 and 772 as illustrated in FIG. 13 to prevent the first ball spline mechanism and the pole 51 from colliding with the second moving plate 75 and the third moving plate 77 when the arm unit 50 is retracted as illustrated in FIGS. 14, 16, and 18. The open holes 752 and 772 are each formed around the center line of the first spline shaft 81 in a size necessary for the first ball spline mechanism to pass through the hole. The open holes 751 and 771 are each formed around the center line of the pole 51 in a size necessary for the pole 51 to pass through the hole. The third moving plate 77 is provided with different open holes 773 and 774 as illustrated in FIG. 15 to prevent the second ball spline mechanism and the pole 53 from colliding with the third moving plate 77 when the arm unit 50 is retracted. The open hole 774 is formed around the center line of the second spline shaft 83 in a size necessary for the second ball spline mechanism to pass through the hole. The different open hole 773 is formed around the center line of the pole 53 in a size necessary for the pole 53 to pass through the hole.

Figure 12:
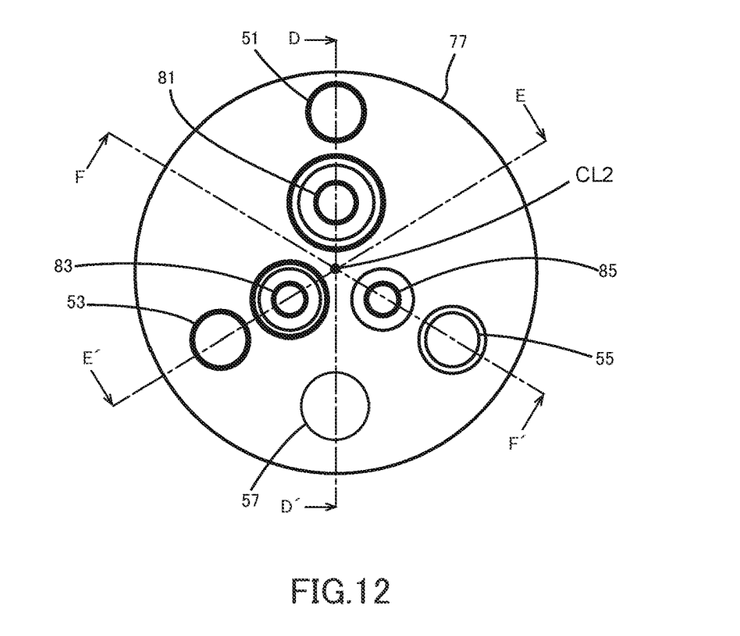
FIG. 12 is a front view of the linear motion mechanism of FIG. 11.

As illustrated in FIG. 12, the first, second, and third spline shafts 81, 83, and 85 are equidistantly spaced on a circumference around the movement axis CL2. In this way, weight balance of the arm unit 50 can be achieved while torsional rigidity can be improved. As also illustrated in FIG. 12, the poles and the ball spline mechanisms are arranged near the movement axis CL2, which makes it possible to suppress an increase in the size of the arm unit 50.

As a matter of course, to improve rigidity of the arm unit 50, the first spline shaft 81 fixed to the base portion 100, which corresponds to the root of the arm unit 50, is preferably thicker than the second and third spline shafts 83 and 85. Further, to reduce weight of the linear motion mechanism, the third spline shaft 85, which corresponds to the leading end of the arm unit 50, is preferably thinner than the first and second spline shafts 81 and 83.

According to the above-described linear motion mechanism 2, a load applied on the arm unit 50 can be distributed to 2 types of mechanisms: a plurality of cascaded linear motion elements (poles and moving plates); and a plurality of ball spline mechanisms, and the plurality of ball spline mechanisms can be arranged near the movement axis CL2. Accordingly, it is possible to realize improvement in the rigidity without increasing the size of the arm unit 50.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A linear motion mechanism comprising:
a plurality of linear motion elements that are cascaded in a mutually movable manner;
a shaft fixed to one of adjacent linear motion elements among the plurality of linear motion elements; and
a slider movably engaged with the shaft and fixed to another of the adjacent linear motion elements,
wherein the shaft is fixed to a linear motion element on a last stage among the plurality of linear motion elements, and the slider is fixed to a linear motion element on a second stage in front of the linear motion element on the last stage, and
the linear motion mechanism further comprising: a different shaft fixed to the linear motion element on the second stage; and a different slider movably engaged with the different shaft and fixed to a linear motion element on a third stage in front of the linear motion element on the second stage.

2. The linear motion mechanism according to claim 1, wherein a diameter of the shaft is larger than a diameter of the different shaft.

3. The linear motion mechanism according to claim 1, further comprising: a further different shaft fixed to the linear motion element on the third stage; and a further different slider movably engaged with the further different shaft and fixed to a linear motion element on a fourth stage in front of the linear motion element on the third stage.

4. The linear motion mechanism according to claim 3, wherein a diameter of the further different shaft is thinner than the diameter of the shaft and the diameter of the different shaft.

5. A linear motion mechanism comprising:
a plurality of cylindrical bodies assembled in a multi-stage nested structure; and
a plurality of cascaded ball spline mechanisms, wherein
a spline shaft of each of the ball spline mechanisms is fixed to one of adjacent cylindrical bodies among the plurality of cylindrical bodies,
a nut of each of the ball spline mechanisms is fixed to another of the adjacent cylindrical bodies, and
the plurality of ball spline mechanisms are arranged within the cylindrical bodies in an off-axis manner from a center line.

6. A linear motion mechanism comprising:
a plurality of linear motion elements that are cascaded in a mutually movable manner;
a shaft fixed to a linear motion element on a last stage among the plurality of linear motion elements, or fixed to a linear motion element on a second stage in front of the linear motion element on the last stage;

a slider movably engaged with the shaft, the slider being fixed to the linear motion element on the second stage if the shaft fixed to the linear motion element on the last stage, or the slider being fixed to the linear motion element on the last stage if the shaft fixed to the linear motion element on the second stage;

a different shaft fixed to the linear motion element on the second stage, or fixed to a linear motion element on a third stage in front of the linear motion element on the second stage;

a different slider movably engaged with the different shaft, the different slider being fixed to the linear motion element on the second stage if the different shaft fixed to the linear motion element on the third stage, or the different slider being fixed to the linear motion element on the third stage if the different shaft fixed to the linear motion element on the second stage.

7. A linear motion mechanism comprising:

a plurality of cylindrical bodies assembled in a multi-stage nested structure; and a ball spline mechanism, wherein
  a spline shaft of the ball spline mechanism is fixed to one of adjacent cylindrical bodies among the plurality of cylindrical bodies, a nut of the ball spline mechanism is fixed to another of the adjacent cylindrical bodies, and the ball spline mechanism is arranged within the cylindrical bodies in an off-axis manner from a center line.

* * * * *